United States Patent
Takeuchi et al.

(10) Patent No.: US 10,400,755 B2
(45) Date of Patent: Sep. 3, 2019

(54) STATE MONITORING SYSTEM

(71) Applicant: NTN CORPORATION, Osaka-shi, Osaka (JP)

(72) Inventors: Akitoshi Takeuchi, Kuwana (JP); Takashi Haseba, Kuwana (JP); Keisuke Hashizume, Kuwana (JP); Kazuki Koyamachi, Kuwana (JP)

(73) Assignee: NTN Corporation, Osaka (JP)

( * ) Notice: Subject to any disclaimer, the term of this patent is extended or adjusted under 35 U.S.C. 154(b) by 202 days.

(21) Appl. No.: 15/128,574

(22) PCT Filed: Mar. 17, 2015

(86) PCT No.: PCT/JP2015/057854
§ 371 (c)(1),
(2) Date: Sep. 23, 2016

(87) PCT Pub. No.: WO2015/146705
PCT Pub. Date: Oct. 1, 2015

(65) Prior Publication Data
US 2017/0096986 A1 Apr. 6, 2017

(30) Foreign Application Priority Data

Mar. 25, 2014 (JP) .................. 2014-062093
Apr. 16, 2014 (JP) .................. 2014-084459

(51) Int. Cl.
*H04L 1/08* (2006.01)
*H04L 1/16* (2006.01)
(Continued)

(52) U.S. Cl.
CPC ............ *F03D 17/00* (2016.05); *F03D 80/70* (2016.05); *H04L 1/08* (2013.01); *H04L 1/1678* (2013.01); *F05B 2270/334* (2013.01); *H04L 1/18* (2013.01)

(58) Field of Classification Search
CPC .... F03D 17/00; F03D 80/70; F05B 2270/334; H04L 1/08; H04L 1/1678; H04L 1/18
See application file for complete search history.

(56) References Cited

U.S. PATENT DOCUMENTS

2004/0156366 A1* 8/2004 Walls .................... H04L 1/1867
370/394
2008/0069693 A1* 3/2008 Malakhova ............. F03D 7/047
416/61
(Continued)

FOREIGN PATENT DOCUMENTS

CN 201886033 U 6/2011
CN 102379104 A 3/2012
(Continued)

OTHER PUBLICATIONS

Search Report issued in corresponding International Application No. PCT/JP2015/057854, dated Jun. 23, 2015.
(Continued)

*Primary Examiner* — Omeed Alizada
(74) *Attorney, Agent, or Firm* — McDermott Will & Emery LLP

(57) ABSTRACT

Provided is a state monitoring system that monitors a state of an apparatus provided in a wind turbine, including a wireless measuring unit including a sensor provided to the apparatus, and a data collection. The wireless measuring unit includes a memory storing measured data obtained from the sensor, and a wireless communication unit transmitting the measured data obtained from the sensor to the data collection device. When the data collection device has not been able to receive the measured data from the wireless measuring unit, the data collection device requests the wireless measuring unit to retransmit the measured data.

10 Claims, 12 Drawing Sheets

(51) Int. Cl.
*H04L 1/18* (2006.01)
*F03D 17/00* (2016.01)
*F03D 80/70* (2016.01)

(56) References Cited

U.S. PATENT DOCUMENTS

| | | |
|---|---|---|
| 2009/0232635 A1 | 9/2009 | Menke |
| 2012/0022815 A1 | 1/2012 | Murakami et al. |
| 2012/0025528 A1 | 2/2012 | Sipila et al. |
| 2012/0156034 A1 | 6/2012 | Sabannavar et al. |
| 2013/0178224 A1 | 7/2013 | Chang et al. |
| 2013/0344814 A1 | 12/2013 | Fujishiro |
| 2014/0313917 A1* | 10/2014 | Jung ................ H04L 67/327 370/252 |
| 2015/0116131 A1 | 4/2015 | Ikeda et al. |

FOREIGN PATENT DOCUMENTS

| | | |
|---|---|---|
| CN | 102788652 A | 11/2012 |
| CN | 103033123 A | 4/2013 |
| CN | 103119867 A | 5/2013 |
| CN | 103416084 A | 11/2013 |
| JP | H02-87892 A | 3/1990 |
| JP | 2003-115892 A | 4/2003 |
| JP | 2012-098149 A | 5/2012 |
| JP | 2012-172623 A | 9/2012 |
| JP | 2013-185507 A | 9/2013 |
| WO | 2011/089678 A1 | 7/2011 |
| WO | 2013/133002 A1 | 9/2013 |

OTHER PUBLICATIONS

Extended European Search Report issued in corresponding European Patent Application No. 15769002.5, dated Oct. 20, 2017.
Chinese Office Action issued in corresponding Chinese Patent Application No. 201580016079.X, dated Jun. 15, 2018, with English Translation.
Japanese Decision to Grant Patent issued in corresponding Japanese Patent Application No. 2014-084459, dated Aug. 28, 2018, with English Translation.

* cited by examiner

STATE MONITORING SYSTEM

CROSS REFERENCE

This application is the U.S. National Phase under 35 U.S.C. § 371 of International Application No. PCT/JP2015/057854, filed on Mar. 17, 2015, which claims the benefit of Japanese Application No. 2014-062093, filed on Mar. 25, 2014 and Japanese Application No. 2014-084459, filed on Apr. 16, 2014, the entire contents of each are hereby incorporated by reference.

TECHNICAL FIELD

The present invention relates to a state monitoring system, and in particular to a state monitoring system that monitors the state of a wind turbine.

BACKGROUND ART

In a wind turbine, when a main shaft connected to blades for receiving a wind force rotates, rotation of the main shaft is accelerated by a speed increasing gear. By the accelerated rotation of the main shaft, a rotor of a power generator rotates to generate electric power. In order to diagnose the state of a wind turbine, vibration of the main shaft, the speed increasing gear, the power generator, and the like is measured by a vibration sensor.

A state monitoring system disclosed in PTD 1 (Japanese Patent Laying-Open No. 2013-185507) is constituted to include a current sensor or a vibration sensor attached inside a nacelle, a monitor device inside the nacelle, and a data server. The vibration sensor or the current sensor transmits a measured value to the monitor device by wireless communication. The monitor device transmits the measured value from the vibration sensor or the current sensor to the data server.

A portable vibration diagnosis device disclosed in PTD 2 (Japanese Patent Laying-Open No. 2012-98149) includes a plurality of vibration sensor units, and a vibration diagnosis unit that receives wireless signals transmitted from the vibration sensor units and diagnoses an apparatus.

CITATION LIST

Patent Document

PTD 1: Japanese Patent Laying-Open No. 2013-185507
PTD 2: Japanese Patent Laying-Open No. 2012-98149

SUMMARY OF INVENTION

Technical Problem

Although the measured value of the vibration sensor or the current sensor is wirelessly transmitted in PTDs 1 and 2, communication may be interrupted depending on the communication environment such as an electric wave condition. However, PTDs 1 and 2 do not disclose a countermeasure for such a problem. Therefore, the state monitoring system of PTDs 1 and 2 cannot perform an appropriate diagnosis depending on the communication environment.

Accordingly, an object in an aspect of the present disclosure is to provide a state monitoring system that can appropriately monitor the state of a wind turbine.

Solution to Problem

A state monitoring system according to one embodiment is a state monitoring system that monitors a state of an apparatus provided in a wind turbine, including a wireless measuring unit including a sensor provided to the apparatus, and a data collection device.

The wireless measuring unit includes a first memory storing measured data obtained from the sensor, and a wireless communication unit transmitting the measured data obtained from the sensor to the data collection device.

When the data collection device has not been able to receive the measured data from the wireless measuring unit, the data collection device requests the wireless measuring unit to retransmit the measured data.

Preferably, the wireless measuring unit further includes a first timer. The wireless measuring unit stores, in the first memory, the measured data which is obtained from the sensor and with which first time data measured by the first timer is associated according to order of measurement. The wireless measuring unit, a request for retransmission transmitted through the wireless communication unit includes information that specifies the first time data of the measured data which has not been able to be received by the data collection device.

Preferably, the data collection device includes a second timer. The data collection device uses second time data measured by the second timer to perform synchronous processing that transmits a time measurement request requesting the first timer to measure time in synchronization with the second timer to the wireless measuring unit.

Preferably, the data collection device obtains measured data from a sensor which is different from the sensor and is provided to the apparatus. The data collection device stores the obtained measured data with which second time data measured by the second timer is associated according to order of measurement.

Preferably, the data collection device designates a time interval for measurement to the wireless measuring unit, and requests the wireless measuring unit to divide a plurality of measured data into a plurality of blocks for each designated number of data, and to transmit the measured data in the divided blocks.

Preferably, when the data collection device has not been able to receive all of the measured data, the data collection device requests the wireless measuring unit to retransmit the measured data other than already received blocks.

Preferably, when the data collection device has not been able to receive all of the measured data from the wireless measuring unit, the data collection device receives the blocks having a reduced number of the measured data per block.

A state monitoring system according to another embodiment is a state monitoring system that monitors a state of an apparatus provided in a wind turbine, including a wireless measuring unit including a sensor provided to the apparatus for detecting the state, and a data collection device.

The wireless measuring unit includes a memory storing measured data obtained from the sensor, a wireless communication unit communicating with the data collection device, and a controller.

When the wireless communication unit receives a request from the data collection device, the controller transmits a data group including a predetermined number of measured data of a plurality of measured data stored in the memory, through the wireless communication unit.

Preferably, the request includes a requested data number indicating the number of the measured data requested. The predetermined number is indicated by the requested data number included in the request.

Preferably, when the data collection device has not been able to receive the data corresponding to the request, the data collection device retransmits the request to the wireless measuring unit.

Preferably, in the state monitoring system, the apparatus includes a bearing that supports a shaft connected to a windmill. The bearing has an inner race through which the shaft passes, and an outer race provided around an outer circumference of the inner race. One of the inner race and the outer race rotates concentrically about the shaft in cooperation with rotation of the windmill, and the other is fixed. The wireless measuring unit including the sensor is provided on at least one of the inner race and the outer race.

A state monitoring system that monitors a state of an apparatus provided in a wind turbine according to another embodiment includes a wireless measuring unit including a sensor provided to the apparatus for detecting the state, and a data collection device, the wireless measuring unit including a memory storing measured data obtained from the sensor, a wireless communication unit communicating with the data collection device, and a controller transmitting a data group including a predetermined number of measured data of a plurality of measured data stored in the memory, through the wireless communication unit, when the wireless communication unit receives a request from the data collection device.

Preferably, the request includes a requested number indicating the number of the measured data requested to be received, and the predetermined number is indicated by the requested number included in the received request.

Preferably, when the data corresponding to the request has not been able to be received, the data collection device retransmits the request to the wireless measuring unit.

Preferably, the apparatus includes a bearing that supports a shaft connected to a windmill, the bearing has an inner race through which the shaft passes, and an outer race provided around an outer circumference of the inner race, one of the inner race and the outer race rotates concentrically about the shaft in cooperation with rotation of the windmill, and the other is fixed, and the wireless measuring unit including the sensor is provided on at least one of the inner race and the outer race.

Advantageous Effects of Invention

According to the present disclosure, when the data collection device has not been able to receive the measured data from the wireless measuring unit through wireless communication, the data collection device requests the wireless measuring unit to retransmit the measured data. Thereby, the measured data for monitoring the state can be obtained without loss.

DESCRIPTION OF EMBODIMENTS

Figure 1:
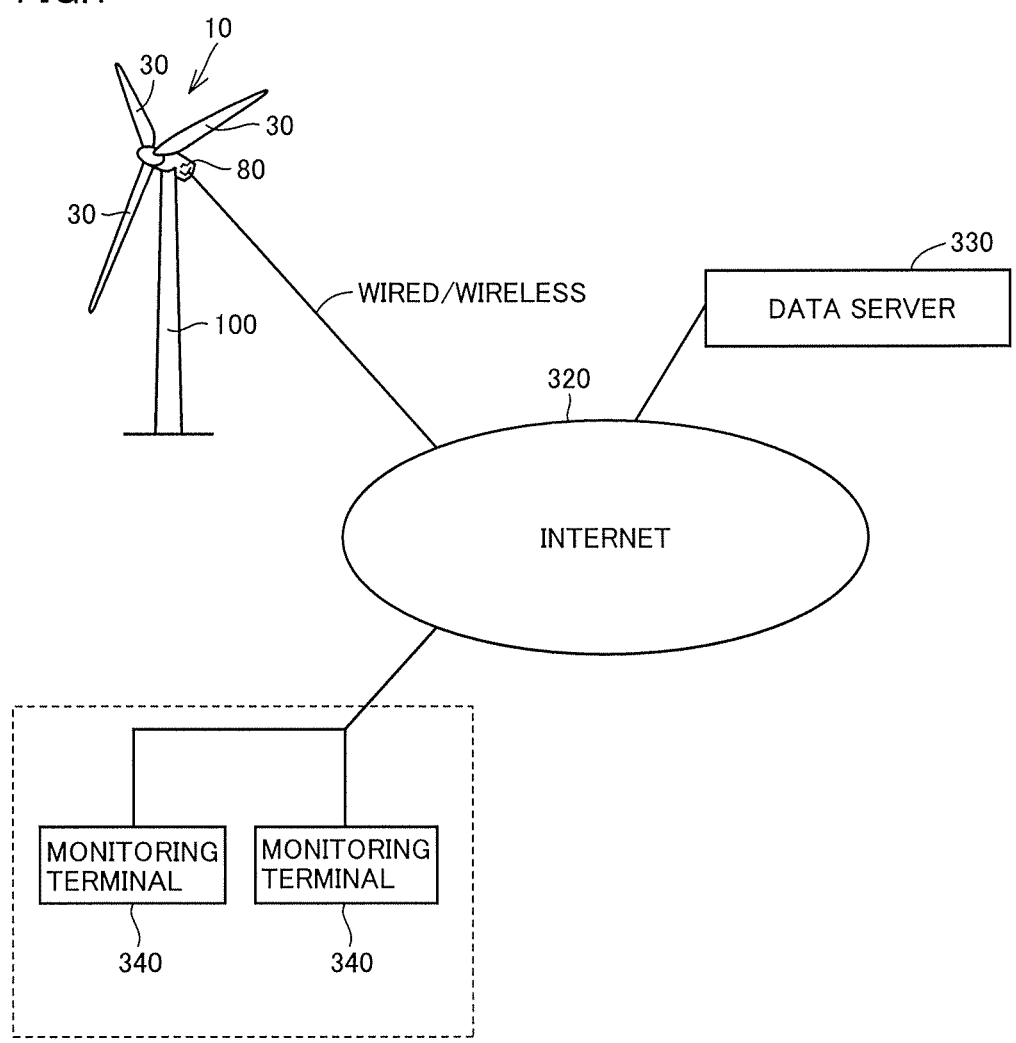
FIG. 1 is a view schematically showing an entire configuration of a state monitoring system in accordance with a first embodiment.

Hereinafter, a state monitoring system and relevant parts in accordance with embodiments will be described with reference to the drawings. In the drawings, identical or corresponding parts will be designated by the same reference numerals, and an overlapping description may not be repeated. It is originally intended to combine features of the embodiments as appropriate for use.

First Embodiment

Entire Configuration of State Monitoring System

FIG. 1 is a view schematically showing an entire configuration of a state monitoring system of a first embodiment. Referring to FIG. 1, the state monitoring system that monitors an operating state of a wind turbine 10 includes a data collection device 80 corresponding to a device for collecting data for monitoring, a data server 330, and monitoring terminals 340. Data collection device 80, data server 330, and monitoring terminals 340 communicate through wired and wireless communication paths including the Internet 320. Data server 330 includes a cloud server, for example.

Figure 2:
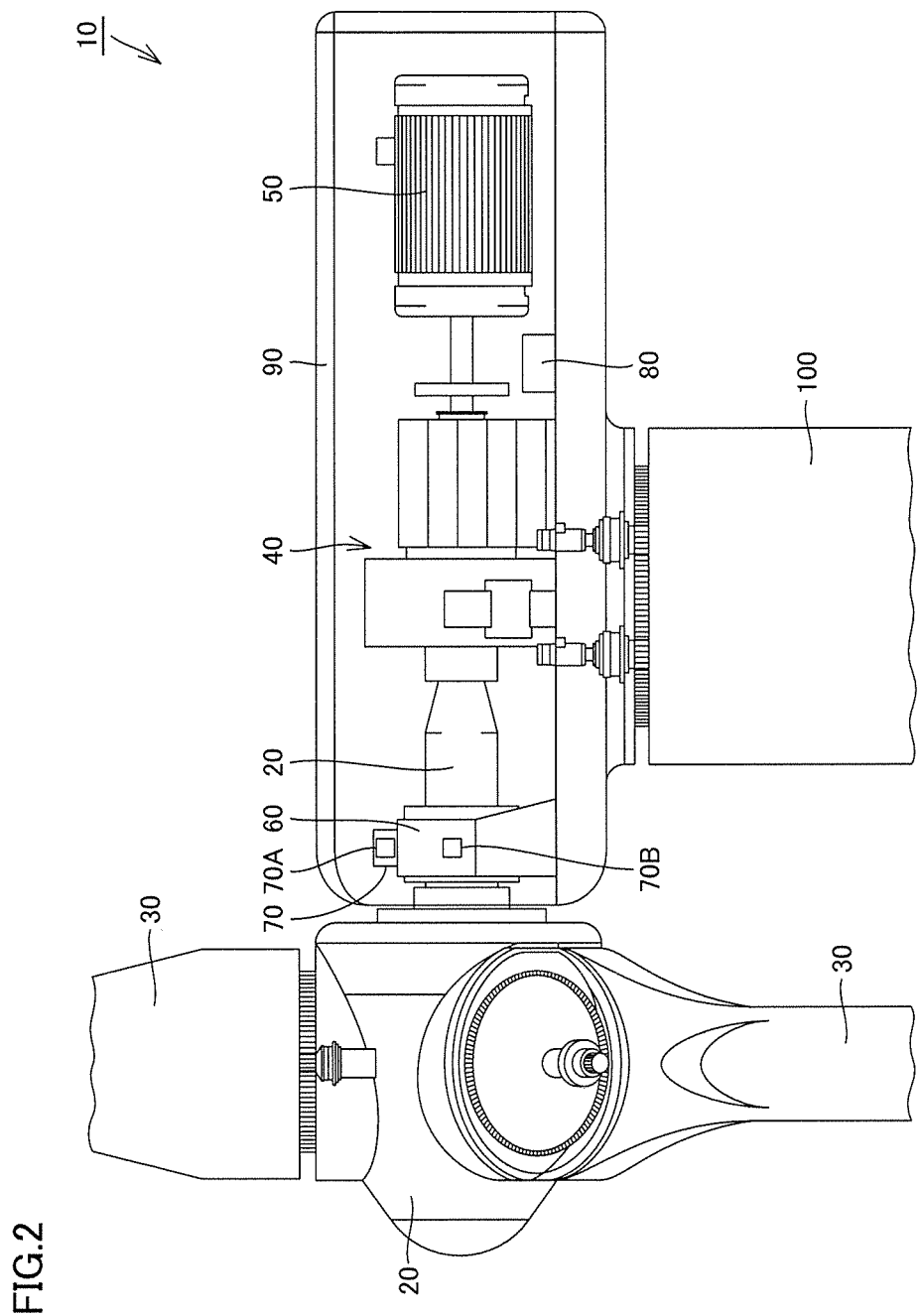
FIG. 2 is a view schematically showing a configuration of a wind turbine 10 in accordance with the first embodiment.

Data collection device 80 wirelessly communicates with a wireless measuring unit 70 described later (FIG. 2). A vibration sensor 70A is connected to wireless measuring unit 70 by a wired cable, and a vibration sensor 70B is connected to data collection device 80 by a wired cable (FIG. 2). A wireless LAN (Local Area Network) can be used as a method for wireless communication between data collection device 80 and wireless measuring unit 70.

Each of monitoring terminals 340 corresponds to a personal computer connected to an intra-company LAN. Each monitoring terminal 340 communicates with data server 330 through the Internet 320. In this communication, each monitoring terminal 340 views measured data through data server 330 and analyzes the measured data in detail. Each monitoring terminal 340 communicates with data server 330 to modify setting information for data collection device 80. Further, each monitoring terminal 340 receives information indicating the state of each apparatus in wind turbine 10 from data server 330, and causes a display unit to display the received information. Monitoring terminal 340 includes a fixed terminal and a portable terminal that is a mobile body.

In the present embodiment, data collection device 80 wirelessly communicates with wireless measuring unit 70. Therefore, it is not necessary to wire an expensive sensor cable between data collection device 80 and wireless measuring unit 70, and it is only necessary to wire a required power cable.

<Configuration of Wind Turbine 10>

FIG. 2 is a view schematically showing a configuration of wind turbine 10 in FIG. 1. Wind turbine 10 includes a windmill of the type in which a main bearing 60 described later and a power generator 50 which is a power generation unit are integrated (synchronous type). Referring to FIG. 2, wind turbine 10 includes a main shaft 20, blades 30, a gearbox 40 corresponding to a speed increasing gear, power generator 50, and main bearing 60. Wind turbine 10 also includes vibration sensors 70A, 70B and data collection device 80. Gearbox 40, power generator 50, main bearing 60, sensors 70A, 70B, and data collection device 80 are accommodated inside a nacelle 90, and nacelle 90 is supported by a tower 100.

Main shaft 20 enters nacelle 90 and is connected to an input shaft of gearbox 40, and main shaft 20 is rotatably supported by main bearing 60. Blades 30 correspond to a windmill provided at a tip of main shaft 20. Blades 30 receive a wind force, convert the received wind force into a rotary torque, and transfer the converted rotary torque to main shaft 20. Main shaft 20 transfers the rotary torque from blades 30 to the input shaft of gearbox 40.

Figure 3:
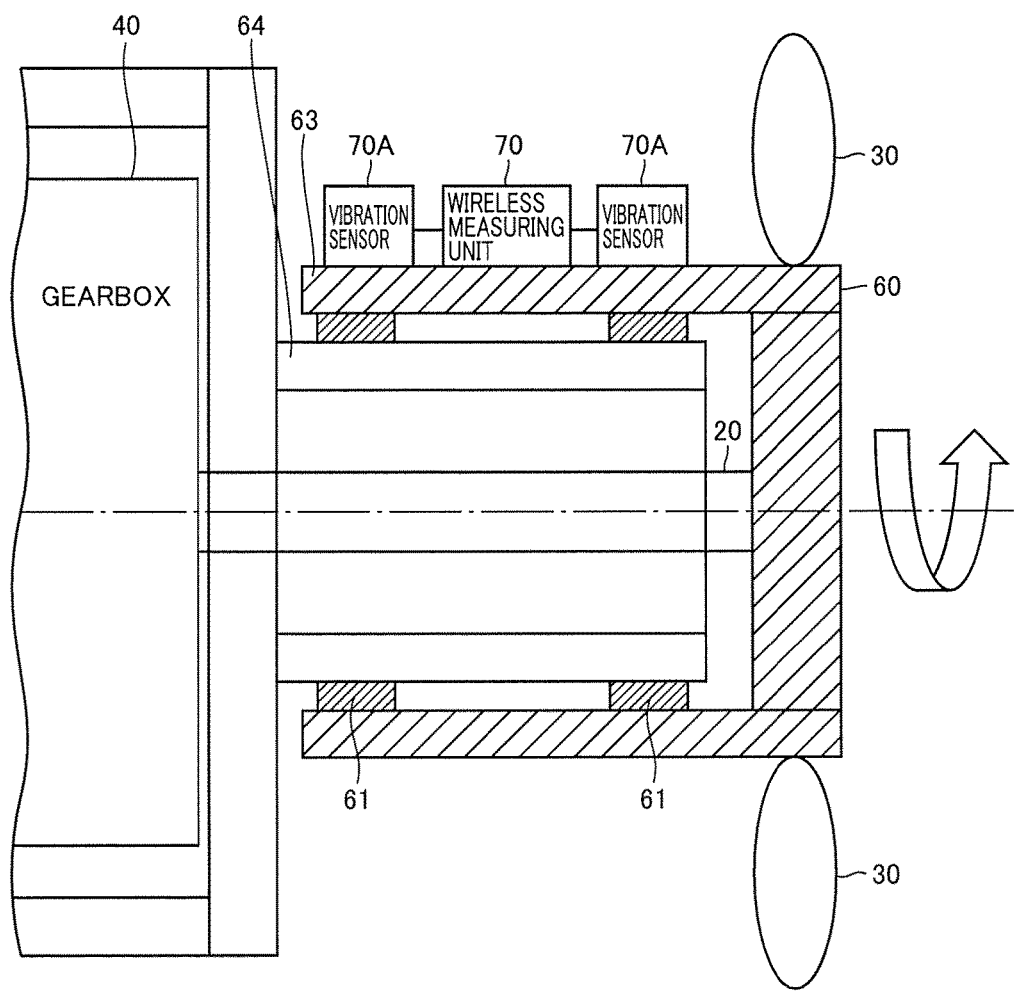
FIG. 3 is a view illustrating a manner of attachment of a wireless measuring unit 70 in accordance with the first embodiment.

Main bearing 60 (an outer race, an inner race, rolling elements) is fixedly provided inside nacelle 90. Main bearing 60 rotatably supports main shaft 20. Main bearing 60 includes an inner race 64 which is fixedly provided (does not rotate) and through which main shaft 20 passes, an outer race 63 provided around inner race 64, and rolling elements 61 (FIG. 3). Rolling elements 61 are placed between inner race 64 and outer race 63. Outer race 63 is constituted integrally with main shaft 20. Thereby, outer race 63 rotates concentrically about main shaft 20 in cooperation with rotation of main shaft 20. Main bearing 60 is constituted, for example, by a self-aligning roller bearing, a conical roller bearing, a cylindrical roller bearing, or a ball bearing. It should be noted that such a bearing may be a single-row or multi-row bearing.

Vibration sensors 70A, 70B are fixedly provided on the rotating outer race of the main bearing, for such a reason that there is no space on the inner-race side and thus it is difficult to access the sensors for maintenance. Specifically, vibration sensors 70A, 70B are fixedly provided on the outer race of main bearing 60 in order to monitor the state of main bearing 60. It should be noted that attached positions of the vibration sensors and the number of the attached vibration sensors are not limited to those described above, and the vibration sensors may be attached to a yaw or blades 30.

Gearbox 40 is provided between main shaft 20 and power generator 50. Gearbox 40 accelerates the rotation speed of main shaft 20, and outputs the accelerated rotation speed to power generator 50. Power generator 50 is connected to an output shaft of gearbox 40. Power generator 50 generates electric power by the rotary torque received from gearbox 40. Power generator 50 is constituted by an induction generator, for example. Data collection device 80 receives measured data of vibration obtained by vibration sensors 70A, 70B. It should be noted that vibration sensors 70A, 70B and data collection device 80 are connected by wired cables. Data collection device 80 communicates to an antenna 81 and an access point 82 by a wireless LAN. Access point 82 communicates with data server 330 by a wired or wireless LAN.

A memory of monitoring terminal 340 at least prestores programs for viewing the measured data, analyzing the measured data in detail, and displaying information about the state of each apparatus in wind turbine 10. Monitoring terminal 340 displays data about each apparatus in wind turbine 10 for supporting a user (specialist) to determine the state of each apparatus. Monitoring terminal 340 receives the measured data received by data collection device 80, from data server 330 that stores the measured data.

(Manner of Attachment of Wireless Measuring Unit 70)

FIG. 3 is a view illustrating a manner of attachment of wireless measuring unit 70 in accordance with the first embodiment. Referring to FIG. 3, in the present embodiment, wireless measuring unit 70 and vibration sensors 70A are attached on the outer-race 63 side of main bearing 60. That is, when there is no space for attaching a vibration sensor on the inner-race 64 side of main bearing 60, or when it is not possible to replace a vibration sensor on the inner-race 64 side, vibration can be measured by attaching a vibration sensor and wireless measuring unit 70 on the rotating outer-race 63 side. For example, in a wind turbine of the type having a rotating outer race, main bearing 60 is constituted such that the inner race is fixed and the outer race rotates, and thus it may be difficult to attach a vibration sensor on the inner-race side. In such a case, wireless measuring unit 70 and vibration sensors 70A are attached on the outer-race 63 side of main bearing 60, as shown in FIG. 3. Here, two vibration sensors 70A are connected to wireless measuring unit 70 through wired communication cables.

In the present embodiment, two vibration sensors 70A connected to wireless measuring unit 70 include vibration sensors 70A fixedly provided on outer race 63 of main bearing 60, for example. Data collection device 80 receives measured data obtained by two vibration sensors 70A from wireless measuring unit 70, and processes the received measured data. Specifically, data collection device 80 calculates a diagnostic parameter such as a root-mean-square value from the measured data of vibration sensors 70A, and transmits the calculated diagnostic parameter together with the time-series measured data to data server 330. Based on the data (the diagnostic parameter, the measured data) received from data collection device 80, data server 330 determines whether or not the data exceeds a threshold (that is, whether or not the bearing is damaged). Data server 330 transmits the result of determination to monitoring terminal 340 and the like.

(Configuration and Manner of Communication of Wireless Measuring Unit 70)

Figure 4:
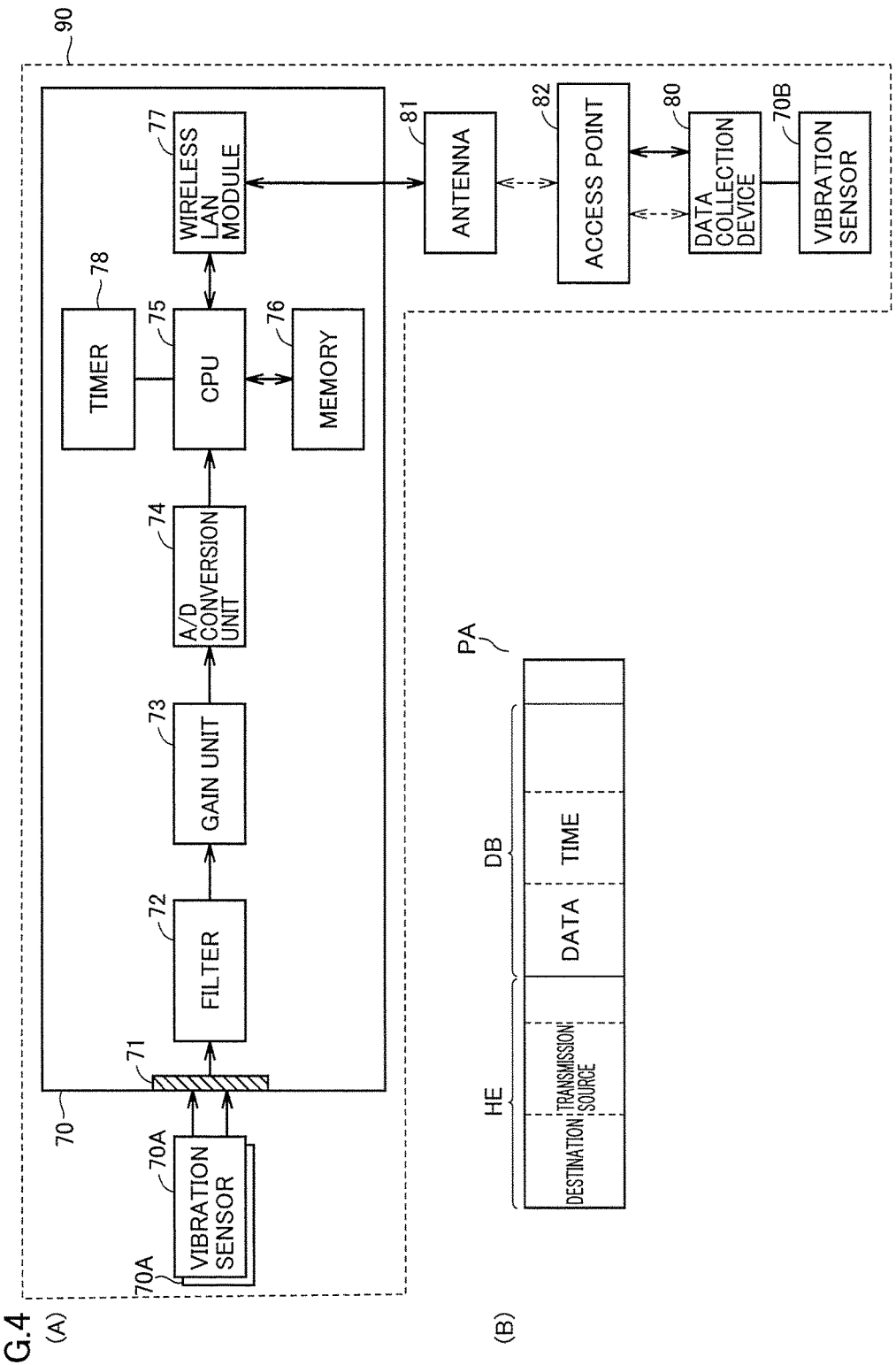
FIGS. 4(A) and (B) are views illustrating a configuration and a manner of communication of wireless measuring unit 70 in accordance with the first embodiment.

FIGS. 4(A) and (B) are views illustrating a configuration and a manner of communication of wireless measuring unit 70 in accordance with the first embodiment. Referring to FIG. 4(A), provided inside nacelle 90 are two vibration sensors 70A, wireless measuring unit 70 that receives outputs from two vibration sensors 70A, antenna 81 connected to wireless measuring unit 70, access point 82 corresponding to a repeater of a wireless LAN, and data collection device 80 that communicates with wireless measuring unit 70. Vibration sensor 70B provided to main bearing 60 is connected to data collection device 80. It should be noted that, in the drawing, a broken line indicates a wireless communication path, and a solid line indicates a wired communication path using a cable or the like.

Wireless measuring unit 70 wirelessly communicates with access point 82 through antenna 81. Data collection device 80 wiredly or wirelessly communicates with access point 82. Therefore, wireless measuring unit 70 communicates with data collection device 80 through access point 82.

Wireless measuring unit 70 includes an input channel 71 that receives measurement signals output from two vibration sensors 70A, a filter 72 that removes a noise component and the like from the measurement signals received by input channel 71, a gain unit 73 that amplifies each signal from filter 72, and an A/D (analog/digital) conversion unit 74 that converts an output signal (analog signal) from gain unit 73 into digital data. Wireless measuring unit 70 also includes a CPU (Central Processing Unit) 75, and a wireless LAN (Local Area Network) module 77 corresponding to a wireless communication unit. CPU 75 corresponds to a controller that controls each unit of wireless measuring unit 70. Each unit is controlled by a signal (command) and data from CPU 75. Wireless LAN module 77 includes a modem (for modulation and demodulation) and the like. CPU 75 processes the digital data obtained by A/D conversion described above, i.e., measured data. Further, a memory 76 corresponding to a non-volatile or volatile storage area for storing data, and a timer 78 are connected to CPU 75.

Input channel 71 is provided to receive the measurement signals from a plurality of (two) vibration sensors 70A. Input channel 71 receives the measurement signals from two vibration sensors 70A by channel switching according to a control signal from CPU 75. Since input channel 71 of wireless measuring unit 70 has a multi-channel configuration as described above, the length of a sensor cable used can be shortened and the number of wires can be reduced. Thereby, man-hour for placing the apparatuses inside nacelle 90 can be reduced. Further, reduction of work man-hour inside nacelle 90 can shorten work time, and can also shorten the time for which wind turbine 10 is stopped for work. This can suppress reduction of the power generation amount generated by wind turbine 10.

FIG. 4(B) shows an example of a packet for communication. Referring to FIG. 4(B), a packet PA includes a header section HE and a body section DB. Header section HE includes information that identifies a destination and a transmission source of the packet (such as addresses). Body section DB includes data to be transmitted.

When wireless measuring unit 70 transmits the measured data obtained by vibration sensors 70A to data collection device 80, CPU 75 divides a plurality of consecutive time-series measured data from A/D conversion unit 74 into data of predetermined blocks (each including a plurality of measured data corresponding to a length of one second, for example). Hereinafter, data of one block will also be referred to as unit data. CPU 75 generates packet PA having the unit data in body section DB. When packet PA is generated, a block number is given to the measured data of vibration (unit data) in body section DB. The block number indicates the order of measurement (order of time series). In addition, to each measured data of vibration in body section DB, an identifier of vibration sensor 70A which has measured the vibration is given. Preferably, when packet PA is generated, time measurement data output from timer 78, that is, time data indicating times at which vibrations indicated by the measured data (unit data) have been measured, are also stored in body section DB. It should be noted that information for header section HE is prestored in memory 76, and CPU 75 reads the information from memory 76 and stores it in header section HE.

When CPU 75 receives a command from data collection device 80, CPU 75 transmits packet(s) PA to data collection device 80 through wireless LAN module 77 and antenna 81. Thereby, wireless measuring unit 70 transmits the measured data of vibration obtained by vibration sensors 70A to data collection device 80, according the order of measurement (order of time series) indicated by the block numbers. It should be noted that the data stored in packet PA may include another type of information such as an error correcting code.

(Configuration of Data Collection Device 80)

Figure 5:
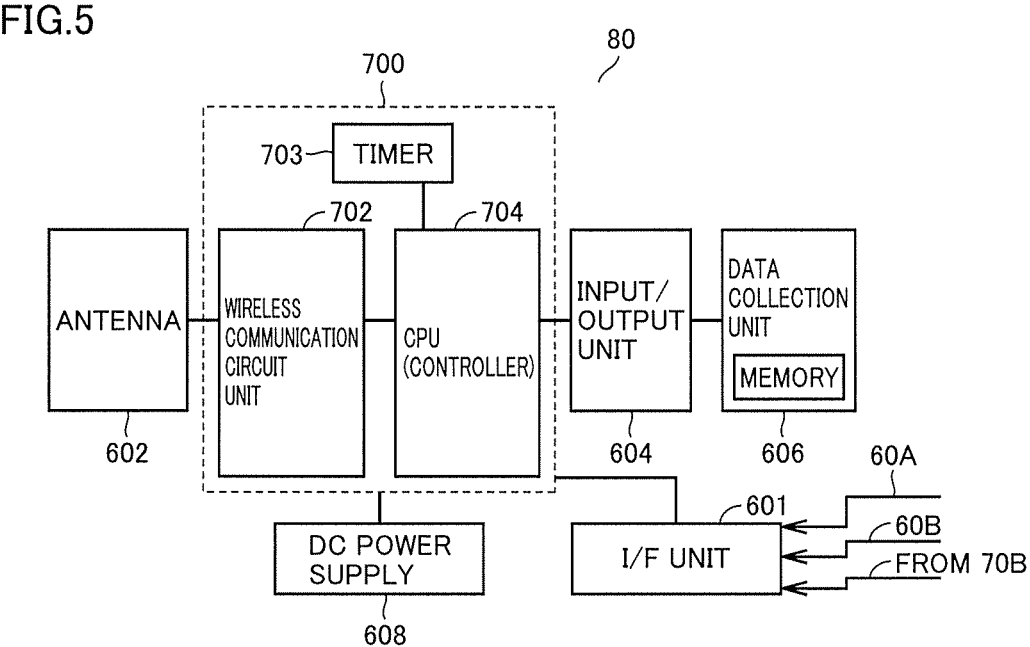
FIG. 5 is a block diagram showing an example of a configuration of a data collection device 80 in accordance with the first embodiment.

FIG. 5 is a block diagram showing an example of a configuration of data collection device 80 in accordance with the first embodiment. Referring to FIG. 5, data collection device 80 includes an antenna 602 for receiving an electric wave, a wireless communication unit 700 that performs control of transmission and reception through antenna 602 and data processing, an input/output unit 604, a data collection unit 606 having a volatile or nonvolatile memory built therein, a DC (Direct Current) power supply 608 that supplies power to wireless communication unit 700, and an I/F (an abbreviation for "Interface") unit 601. I/F unit 601 receives an output from vibration sensor 70B. Input/output unit 604 controls input/output of data between data collection unit 606 and a CPU 704.

I/F unit 601 corresponds to a data obtaining unit that receives measured data of vibration from wiredly connected vibration sensor 70B, and outputs the obtained data and information to CPU 704 in the order of reception (obtainment).

Wireless communication unit 700 includes a wireless communication circuit unit 702, a timer 703, and CPU (Central Processing Unit) 704. Wireless communication circuit unit 702 demodulates a signal received from antenna 602, performs A/D conversion on the demodulated signal, and outputs data obtained by the A/D conversion to CPU 704. Further, wireless communication circuit unit 702 performs D/A (Digital/Analog) conversion on data from CPU 704. Furthermore, wireless communication circuit unit 702 modulates a signal obtained by the D/A conversion, and transmits the modulated signal through antenna 602.

Wireless communication unit 700 receives packet PA storing the measured data of vibration, from wireless measuring unit 70 through antenna 602. Wireless communication unit 700 extracts data (measured data to which the identifier of the vibration sensor is given, associated time data, and the like) from body section DB of received packet PA, and stores the extracted data in a memory of data collection unit 606 through input/output unit 604. Further, wireless communication unit 700 receives the measured data based on the output from vibration sensor 70B, through I/F unit 601. Wireless communication unit 700 stores the measured data in the memory of data collection unit 606 through input/output unit 604. Preferably, wireless communication unit 700 stores the measured data based on the output from vibration sensor 70B, together with associated time data (time data from timer 703 indicating the order of measurement of the measured data), in the memory of data collection unit 606 through input/output unit 604.

Further, when wireless communication unit 700 receives a request from an external device (such as data server 330) through antenna 602, wireless communication unit 700 reads data (measured data and associated time data) from the memory of data collection unit 606 through input/output unit 604. The read data is transmitted to the requesting device through antenna 602, according to the form of packet PA described above, for example.

Thus, data collection device 80 stores (saves) the measured data of vibration in the memory of data collection unit 606, as time-series data according to the order of measurement. In response to a request, data collection device 80 reads the measured data and the associated time data from data collection unit 606. Data collection device 80 generates packet PA having sets of the read measured data and associated time data stored in body section DB, and transmits generated packet PA to the requesting device (such as data server 330).

Data server 330, which has transmitted the request, stores the received data in a predetermined memory. Thereby, the measured data received from data collection device 80 are accumulated in the memory. Data server 330 reads data from the memory, processes the read data, and transmits the processed data to monitoring terminal 340. Monitoring terminal 340 receives the measured data from data server 330, processes the received data, and outputs the processed data to the display unit and the like. From the output data, the user can monitor the operating state, such as vibration, of wind turbine 10.

(Display Example)

Figure 6:
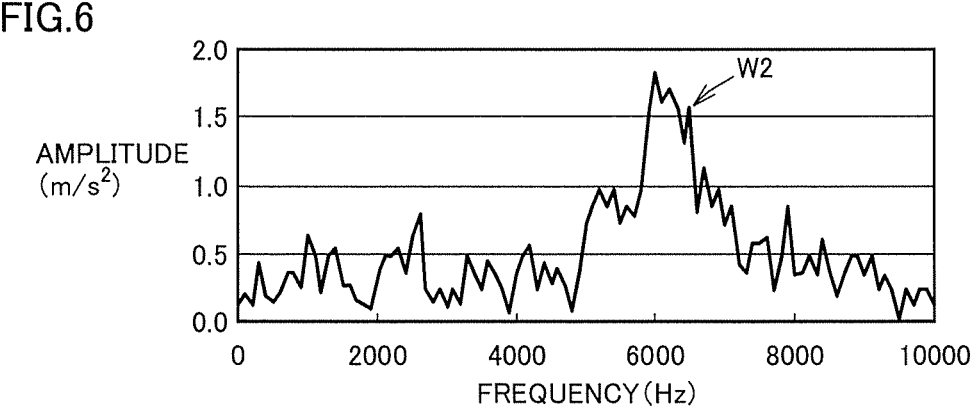
FIG. 6 is a view showing a display example on a monitor in accordance with the first embodiment.

FIG. 6 is a view showing a display example of data in accordance with the first embodiment. FIG. 6 shows the frequency spectrum of vibration based on the measured data. A waveform W2 of the frequency spectrum in FIG. 6 indicates the frequency spectrum of vibration measured under a certain operating condition. Waveform W2 can provide the user with supportive information for diagnosing the operating state of the apparatus to be monitored (main bearing 60) (as being normal/abnormal).

(Operating Condition and Data Collection)

In the present embodiment, measurement of vibration on the wireless measuring unit 70 side is performed in synchronization with collection of data indicating other operating states performed by data collection device 80.

Figure 7:
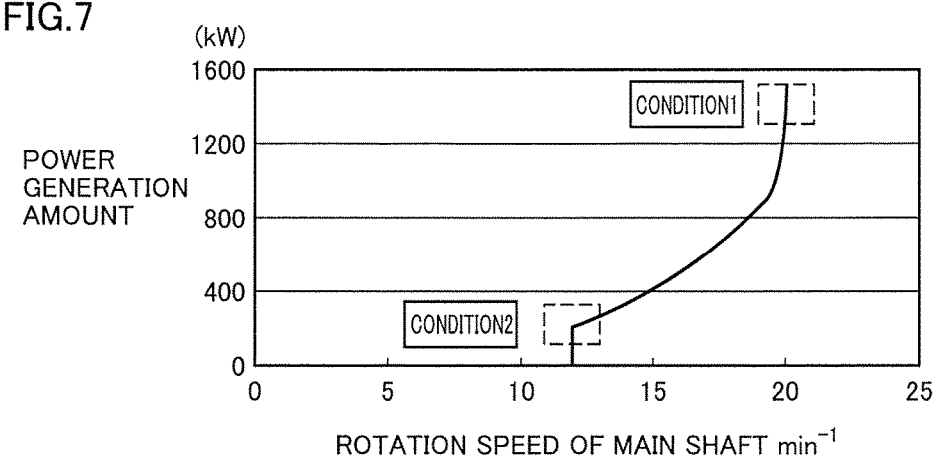
FIG. 7 is a graph for illustrating data measurement and collection in synchronization with an operating condition in accordance with the first embodiment.

FIG. 7 is a graph for illustrating data measurement and collection in synchronization with an operating condition in accordance with the first embodiment. In the graph of FIG. 7, the axis of ordinates represents the power generation amount generated by power generator 50, and the axis of abscissas represents the rotation speed (number of rotations) of main shaft 20. In the present embodiment, power generation amount information 60A and rotation information 60B are shown. Power generation amount information 60A indicates an output of power generator 50. Since the output is proportional to a rotary shaft torque, increase or decrease in the torque of the bearing can be seen from the change in the power generation amount indicated by power generation amount information 60A. Further, rotation information 60B indicates the rotation speed of blades 30 or the rotation speed of the main shaft. The rotation speed of the main shaft indicates the rotation speed of blades 30 accelerated by gearbox 40.

The operating condition of wind turbine 10 varies depending on the environment, such as a wind condition indicating how wind blows. Operating state data indicating operating states such as vibration, rotation speed, power generation amount, and wind speed varies according to the operating condition. That is, in the case where wind turbine 10 is operated under an operating condition varying from hour to hour, it is necessary to determine whether the change in vibration is caused by the varying operating condition, or caused by a damage to the bearing or the gear, in order to accurately diagnose the operating state. Therefore, in the present embodiment, data collection device 80 detects a predetermined operating condition from the graph of FIG. 7, and collects data of various operating states described above (such as data of vibration from each vibration sensor) under the detected operating condition.

Specifically, data collection device 80 generates the graph data of FIG. 7 from time-series power generation amount information 60A and rotation information 60B stored in data server 330. From the generated graph data, data collection device 80 calculates a time period corresponding to a range in which predetermined "condition 1" and "condition 2" (FIG. 7) are satisfied as to the power generation amount and the rotation speed of the main shaft (hereinafter also referred to as a condition period). Data server 330 performs abnormality diagnosis. Specifically, data server 330 compares associated time data of the data from data collection device 80 (including vibration data collected by wireless measuring unit 70 and vibration data from vibration sensor 70B), with a threshold. Based on the result of comparison, data server 330 determines whether or not there is an abnormality. Thereby, the change (trend) in the vibration of each unit under an operating condition where the influence on the torque of the bearing is constant (that is, during the condition period) is detected. The result of detection is output as information for supporting the user to accurately diagnose the operating state. It should be noted that "condition 1" and "condition 2" are determined as to the power generation amount and the rotation speed, from predetermined upper limit value and lower limit value.

Vibration data falling into the condition period described above are identified, and the identified vibration data are stored in a memory of data server 330. That is, the measured data of vibration sensors 70A are stored as time-series data in memory 76 of wireless measuring unit 70. Therefore, when wireless measuring unit 70 receives a request from data collection device 80, wireless measuring unit 70 measures vibration with a time interval designated by data collection device 80. Data of the vibration measured with the time interval (measured data) are transmitted to data server 330 through data collection device 80. The time interval is based on the condition period described above. Thereby, the vibration data falling into the condition period described above are stored in the memory of data server 330.

(Processing Flowchart)

Figure 8:
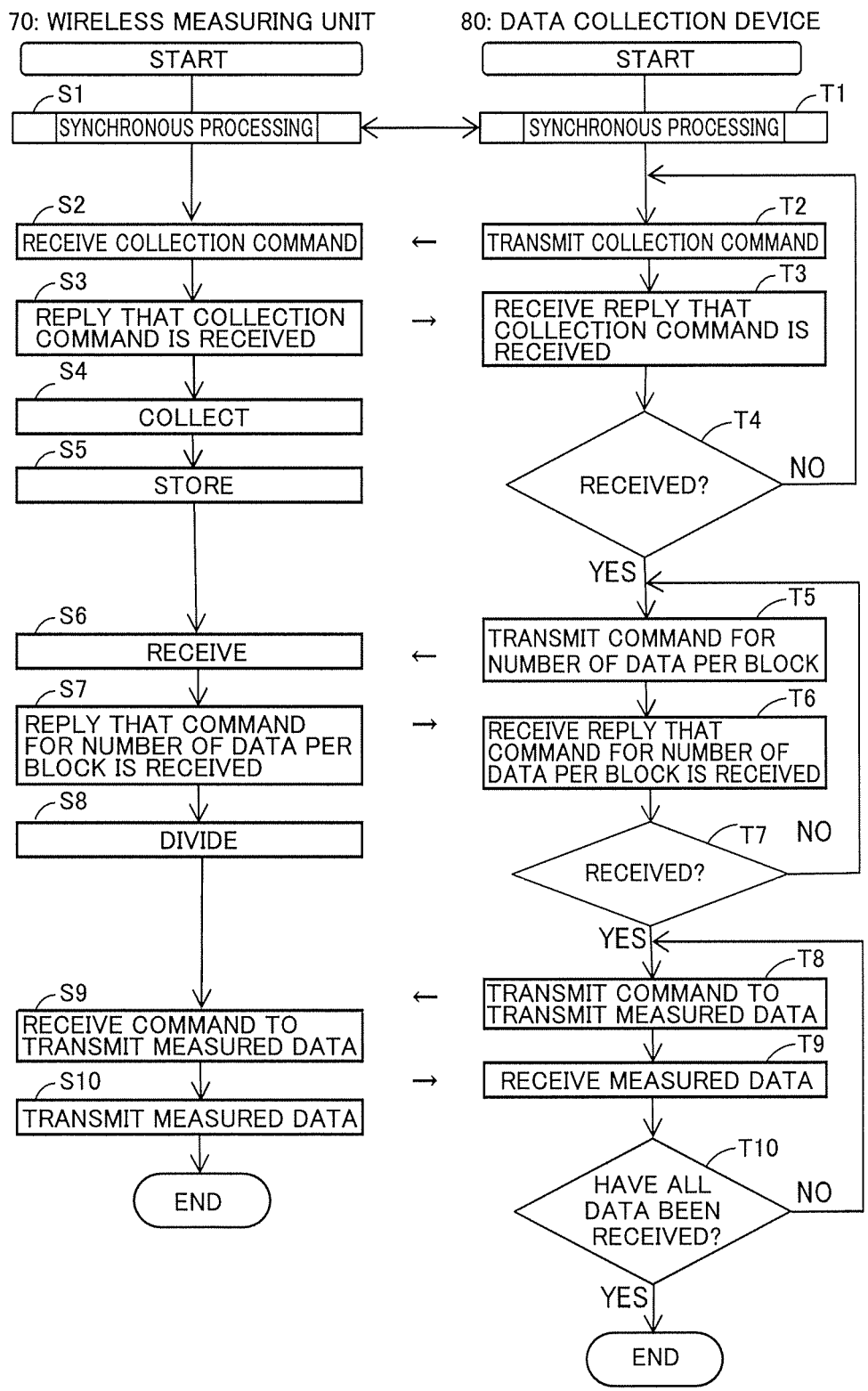
FIG. 8 is a flowchart showing processing related to a communication sequence between wireless measuring unit 70 and data collection device 80 in accordance with the first embodiment.

FIG. 8 is a flowchart showing processing related to a communication sequence between wireless measuring unit 70 and data collection device 80 in accordance with the first embodiment. In a program on the wireless measuring unit 70 side according to this flowchart, CPU 75 performs processing for measurement in response to a measurement command from data collection device 80. The program is stored in memory 76. CPU 75 reads the program from memory 76, and executes the read program. The processing in FIG. 8 is started to be executed when wireless measuring unit 70 and data collection device 80 are powered ON by DC power supply 608 (when power supply is started).

Usually, when wireless measuring unit 70 receives a measurement command from data collection device 80, wireless measuring unit 70 performs measurement. A measurement interval is designated by the measurement command. Next, wireless measuring unit 70 receives a command for designating the number of data per block from data collection device 80. According to the command, wireless measuring unit 70 divides the time-series measured data described above. The divided time-series measured data are transmitted to data collection device 80 in the order of the designated blocks.

Referring to FIG. 8, synchronous processing may be performed between data collection device 80 and wireless measuring unit 70 (step S1, step T1). Specifically, CPU 704 of data collection device 80 transmits time data from timer 703 to wireless measuring unit 70, together with a request to start synchronous processing (step T1). When CPU 75 of wireless measuring unit 70 receives the request to start synchronous processing, CPU 75 sets the time data received together with the start request, to its timer 78. Thereby, synchronous processing is completed for timer 78 of wireless measuring unit 70 and timer 703 of data collection device 80. Hereafter, timer 78 and timer 703 can measure substantially the same time.

Next, in data collection device 80, CPU 704 performs processing for transmitting a command to collect data to wireless measuring unit 70 and receiving a reply to the collection command (steps T2, T3). CPU 704 determines whether or not CPU 704 receives the reply from wireless measuring unit 70 (step T4). As long as CPU 704 determines that CPU 704 does not receive the reply (NO in step T4), the processing returns to step T2. When CPU 704 determines that CPU 704 receive the reply (YES in step T4), CPU 704 performs processing for transmitting a command for designating the number of data per block to wireless measuring unit 70 (step T5), and receiving a reply to the command (step T6). CPU 704 determines whether or not CPU 704 receives the reply to the command (step T7). As long as CPU 704 determines that CPU 704 does not receive the reply (NO in step T7), the processing returns to step T5.

In wireless measuring unit 70, CPU 75 receives the collection command from data collection device 80, and transmits the reply (steps S2, S3). When CPU 75 receives the collection command, CPU 75 starts collection (reception and storage) of the measured data of vibration from vibration sensors 70A (steps S4, S5). Each measured data is associated with time data from timer 78 and is stored in memory 76 (step S5). Thereby, the measured data of vibration are stored in memory 76 in a time-series manner. Further, CPU 75 receives the command for designating the number of data from data collection device 80, and transmits the reply to the command to data collection device 80 (steps S6, S7).

Thereafter, when the measured data are collected (stored) in a predetermined amount (for example, when data for 10 seconds are collected), CPU 75 of wireless measuring unit 70 generates packets PA storing the measured data, and transmits generated packets PA to data collection device 80 (steps S8, S9, and S10). On this occasion, the transmitted data for 10 seconds are divided into a plurality of unit data (step S8). Data collection device 80 transmits a command to transmit the measured data to wireless measuring unit 70, and receives packets PA from wireless measuring unit 70 as a reply to the command (steps T8, T9). CPU 75 of wireless measuring unit 70 receives the transmission command from data collection device 80. As the reply to the transmission command, CPU 75 stores associated time data and block (block including the designated number of measured data) in each packet PA, and transmits packets PA to data collection device 80 (steps S9, S10). Therefore, when one block includes a plurality of measured data corresponding to one second, 10 packets PA are generated from the measured data for 10 seconds, and generated 10 packets PA are transmitted to data collection device 80. CPU 704 of data collection device 80 receives packets PA from wireless measuring unit 70 (step T9), and stores data in body sections DB of received packets PA in the memory of data collection unit 606.

Further, CPU 704 of data collection device 80 determines whether or not to terminate the processing, based on whether or not CPU 704 have received all of the data (step T10). When CPU 704 determines to terminate the processing (YES in step T10), the processing of FIG. 8 is terminated. When CPU 704 determines not to terminate the processing (NO in step T10), the processing returns to step T8 and the subsequent steps are repeated similarly as described above.

By repeating the processing of FIG. 8, data collection device 80 periodically transmits the collection command. However, transmission of the collection command is not limited to periodical transmission. For example, the collection command may be transmitted only once after synchronous processing is performed.

(Retransmission of Data)

In the first embodiment, in a case where missing of communication data (data loss) occurs in wireless communication between wireless measuring unit 70 and data collection device 80, wireless measuring unit 70 retransmits the measured data in memory 76 to data collection device 80.

That is, in the wireless communication described above, CPU 704 of data collection device 80 determines, as to the measured data received from wireless measuring unit 70, whether or not missing of the measured data (data loss) occurs in the time-series data, based on the associated time data. When CPU 704 determines based on the result of determination that there is no missing measured data, that is, the measured data have been normally received, data collection device 80 has been able to receive the measured data for 10 seconds described above.

On the other hand, when CPU 704 determines that there is missing measured data, data collection device 80 has not been able to receive the measured data associated with time data for the 4th second and the 5th second, for example. When such missing in the time-series data is detected, CPU 704 of data collection device 80 transmits a retransmission request for requesting retransmission of the missing data, to wireless measuring unit 70. Based on the retransmission request received from data collection device 80, CPU 704 of wireless measuring unit 70 reads the measured data requested to be retransmitted (that is, the measured data for 10 seconds described above) from memory 76, and transmits a plurality of packets PA storing the read measured data to data collection device 80. Thereby, data collection device 80 can collect the time-series measured data without missing of the measured data.

The retransmission request described above may include the time data associated with the measured data determined as missing (in the above case, the time data indicate the 4th second and the 5th second). In this case, based on the retransmission request, CPU 704 of wireless measuring unit 70 extracts (reads) only the missing measured data (the measured data for the 4th second and the 5th second) of the time-series measured data for 10 seconds in memory 76, and transmits packets PA of the extracted measured data to data collection device 80.

Although the operating state is monitored from the measured data of vibration of each unit of wind turbine 10 in the first embodiment, the type of the measured data is not limited to the measured data of vibration.

Further, when data collection device 80 transmits the retransmission request in the case where data collection device 80 has not been able to receive all of the measured data from wireless measuring unit 70, the retransmission request may include a request to transmit the measured data with the number of the measured data per block being reduced. In a case where data collection device 80 transmits such a retransmission request, data collection device 80 can receive data in blocks each including a reduced number of the measured data, from wireless measuring unit 70.

(First Variation)

A first variation in accordance with the first embodiment shows another exemplary manner of attachment of vibration sensors 70A on main bearing 60.

Figure 9:
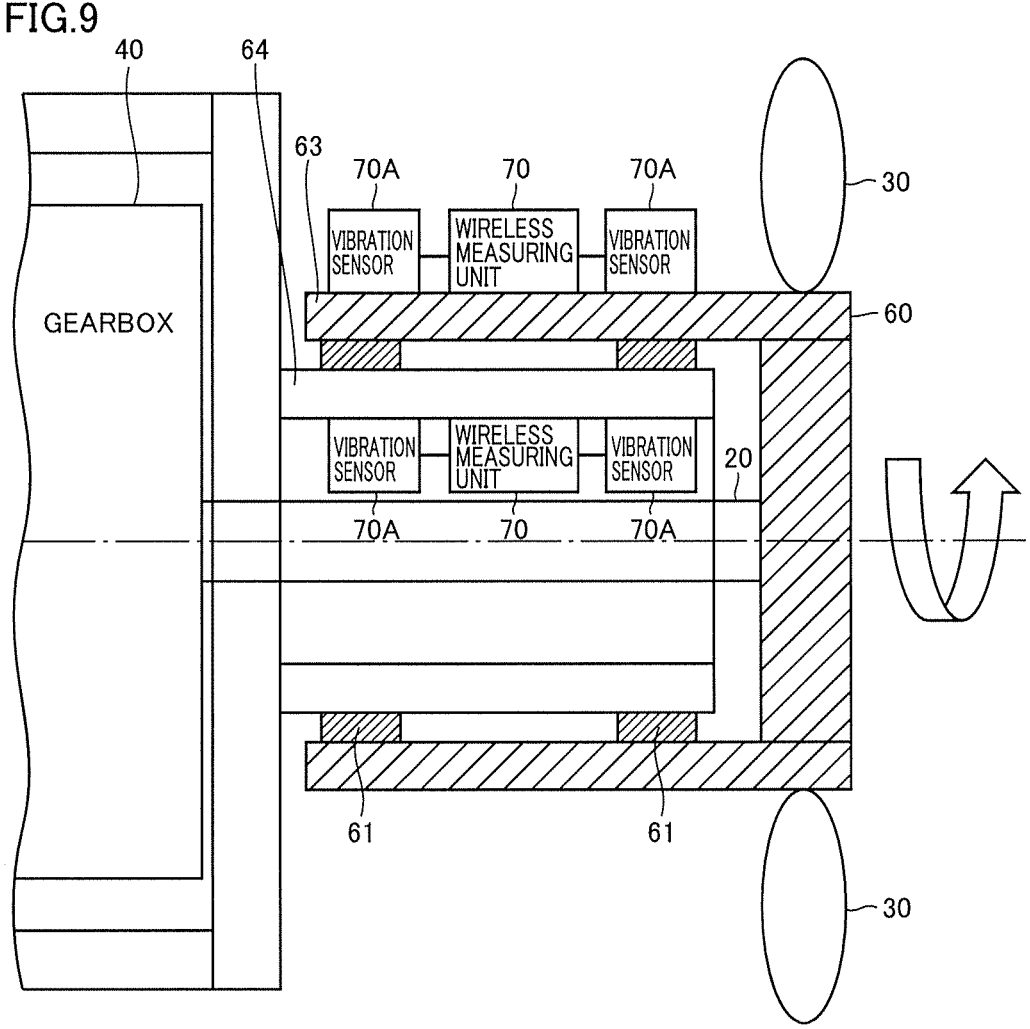
FIG. 9 is a view illustrating a manner of attachment of wireless measuring units 70 in accordance with a first variation of the first embodiment.

FIG. 9 is a view illustrating a manner of attachment of wireless measuring units 70 in accordance with the first variation of the first embodiment. Unlike FIG. 3, in FIG. 9, wireless measuring unit 70 and vibration sensors 70A are attached on rotating outer race 63 of main bearing 60, and wireless measuring unit 70 and vibration sensors 70A are additionally attached on fixed inner race 64 of main bearing 60. Two vibration sensors 70A are connected through cables to each of wireless measuring units 70 on outer race 63 and inner race 64. Data collection device 80 receives packet PA of the measured data from each wireless measuring unit 70. On this occasion, to each measured data stored in body section DB of packet PA, the identifier of vibration sensor 70A which has detected the measured data is given. Wireless measuring unit 70 and data collection device 80 have a table in which the identifiers of vibration sensors 70A and data indicating attached positions of vibration sensors 70A are registered in association with each other.

Therefore, data collection device 80 can search the table based on the identifier given to the received measured data, and determine the attached position of vibration sensor 70A which has detected vibration of the measured data, from the result of search. Information on the determined attached position is transmitted to data server 330 together with the measured data. Monitoring terminal 340 outputs information based on the vibration data received from data server 330 (such as the graph of FIG. 6) so as to be associated with the received information on the attached position. Thereby, information for diagnosing the operating state with a vibration measurement position being specified is provided to the user.

In a case where main bearing 60 is used with the inner race rotating and the outer race being fixed, vibration sensor 70A attached on an outer circumferential surface of outer race 63 as shown in FIG. 3 can detect vibration caused by a damage to the outer circumferential surface of outer race 63 close to the attached position. On the other hand, in the case of large-sized main bearing 60 such as that for wind turbine 10, a damage to an inner circumferential surface of outer race 63 opposite to the attached position in FIG. 3 is apart from the attached position of vibration sensor 70A on the outer circumferential surface in FIG. 3, and thus the detection sensitivity to vibration is not high.

Accordingly, vibration sensors 70A are attached on an inner circumferential surface of rotating inner race 64 as shown in FIG. 9. In this case, rotation of inner race 64 allows vibration sensors 70A to come close to a damaged position in the inner circumferential surface of outer race 63. Thereby, the detection sensitivity to a damage in the outer race can be increased.

On the other hand, also in the case where main bearing 60 is used with the inner race being fixed and the outer race rotating, diagnostic accuracy can be improved by attaching vibration sensors 70A on fixed inner race 64 and rotating outer race 63.

(Second Variation)

In a second variation of the first embodiment, information for diagnosing the operating state is detected by data collection device 80.

Specifically, CPU 704 of data collection device 80 calculates a root-mean-square value or a peak value from the received time-series measured data, and transmits the result of calculation to data server 330. Monitoring terminal 340 stores data such as the root-mean-square value or the peak value received from data server 330 in the memory, or causes the display unit to display the data.

The time-series data of the measured data and the data such as the root-mean-square value or the peak value are stored in data server 330. Thereby, monitoring terminal 340 can perform frequency analysis or envelope processing using the data stored in data server 330. Therefore, in a case where further detailed diagnosis is required for example when the root-mean-square value or the peak value calculated based on the measured data exceeds a threshold, it is possible to easily obtain the measured data based on which the root-mean-square value or the peak value has been calculated, and to provide the obtained measured data for accurate diagnosis of the operating state.

Second Embodiment

A second embodiment shows a variation of the first embodiment. The second embodiment includes a wireless measuring unit 710 instead of wireless measuring unit 70 of the first embodiment. The second embodiment also includes a data collection device 800 instead of data collection device 80 of the first embodiment. Since the state monitoring system of the second embodiment is the same as that shown in FIG. 1, the description of the configuration of the state monitoring system will not be repeated. Further, since wind turbine 10 of the second embodiment has the same configuration as that shown in FIG. 2, the description of the configuration of the wind turbine will not be repeated.

(Manner of Attachment)

Figure 10:
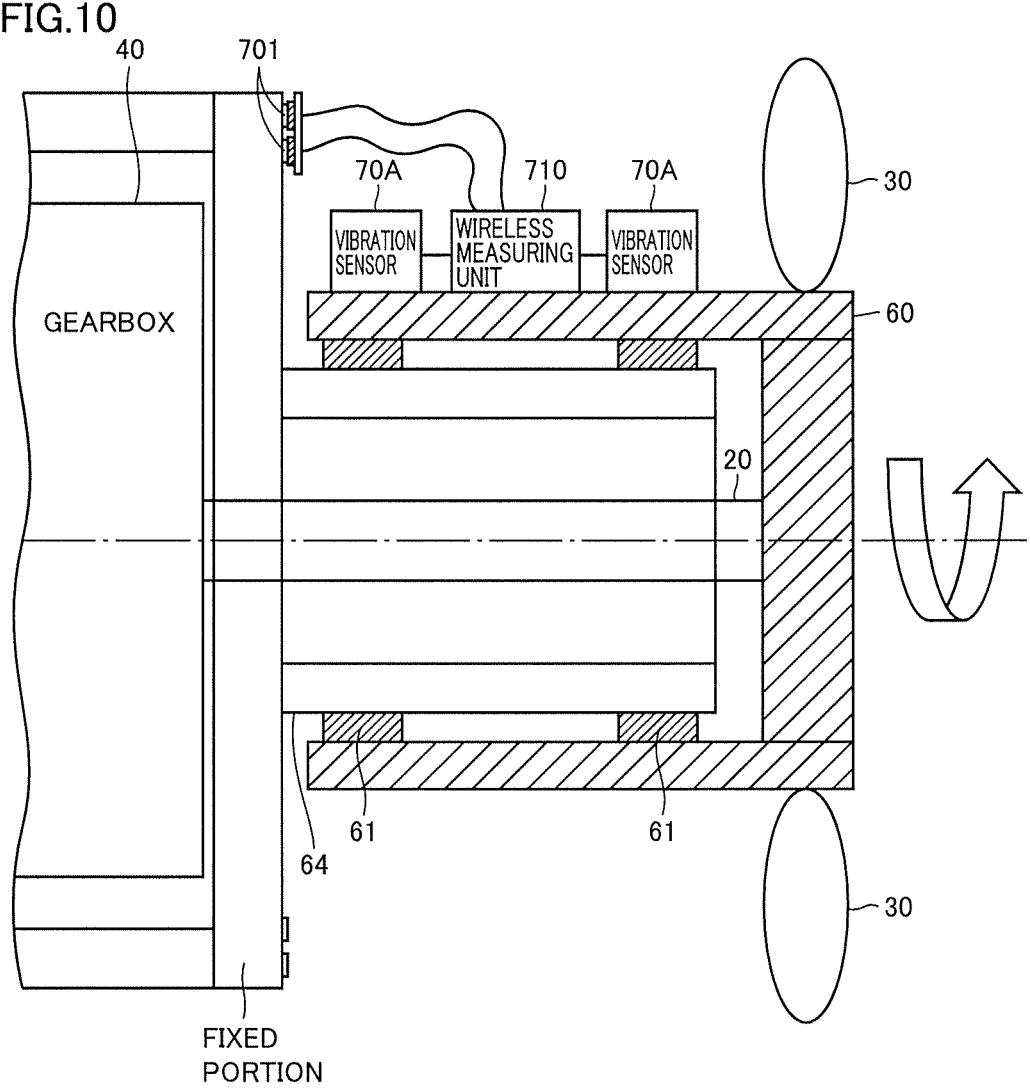
FIG. 10 is a view illustrating a manner of attachment of a wireless measuring unit in accordance with a second embodiment.

Referring to FIG. 10, in the second embodiment, wireless measuring unit 710 is cable-connected to a slip spring 701 which is a power supply unit, and is supplied with power. Vibration sensors 70A are supplied with power from wireless measuring unit 710. Further, wireless measuring unit 710 and vibration sensors 70A are attached on the outer-race side of main bearing 60. As in the first embodiment, when there is no space for attaching a vibration sensor on the inner-race 64 side of main bearing 60, or when it is not possible to replace a vibration sensor on the inner-race 64 side, vibration can be measured by attaching vibration sensors 70A and wireless measuring unit 710 on the rotating outer-race side. For example, in a wind turbine of the type having a rotating outer race, main bearing 60 is constituted such that the inner race is fixed and the outer race rotates, and thus it may be difficult to attach a vibration sensor on the inner-race side. In such a case, wireless measuring unit 710 and vibration sensors 70A are attached on the outer-race side of main bearing 60, as shown in FIG. 10.

Although it is herein described that wireless measuring unit 710 and vibration sensors 70A are attached on the outer-race side, attached positions thereof are not limited to be on the outer-race side.

As shown in FIG. 10, main bearing 60 that supports a shaft connected to a windmill has inner race 64 through which the shaft passes, and an outer race provided around an outer circumference of inner race 64. One of inner race 64 and the outer race rotates concentrically about the shaft in cooperation with rotation of the windmill, and the other is fixed. Vibration sensors 70A and wireless measuring unit 710 may be provided on at least one of inner race 64 and the outer race.

(Configuration and Manner of Communication of Wireless Measuring Unit 710)

Figure 11:
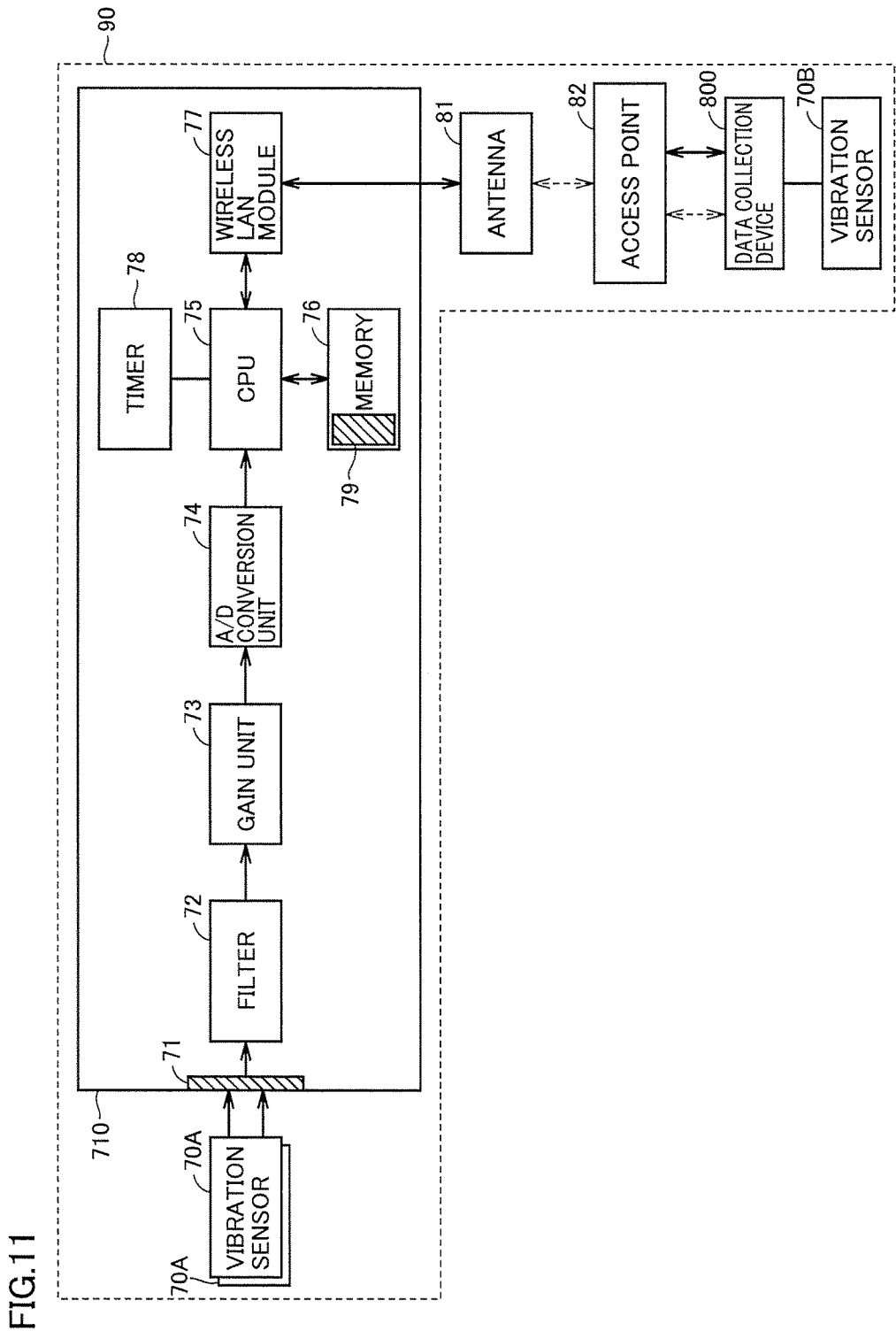
FIG. 11 is a view illustrating a configuration and a manner of communication of the wireless measuring unit in accordance with the second embodiment.

FIG. 11 is a view illustrating a configuration and a manner of communication of wireless measuring unit 710 in accordance with the second embodiment. Referring to FIG. 11, nacelle 90 includes wireless measuring unit 710 and data collection device 800 therein. Since other components inside nacelle 90 are the same as those of the first embodiment, the description thereof will not be repeated.

Data collection device 800 is connected with antenna 81 and access point 82 by a wireless LAN. Access point 82 is connected with data server 330 by a wired or wireless LAN. Data collection device 800 wiredly or wirelessly communicates with access point 82. Therefore, wireless measuring unit 710 communicates with data collection device 800 through access point 82.

Wireless measuring unit 710 includes memory 76. Memory 76 includes a storage area 79 corresponding to a flash memory. Storage area 79 stores measured data of vibration sensors 70A. Since other components of wireless measuring unit 710 are the same as those shown in FIG. 4, the description thereof will not be repeated.

(Wireless Measuring Unit 710)

Wireless measuring unit 710 transmits measured data of vibration to data collection device 800 by wireless communication. Wireless measuring unit 710 stores the measured data from vibration sensors 70A in storage area 79. For example, wireless measuring unit 710 stores the measured data received in a time-series manner, in an array area secured beforehand in storage area 79, in the order of reception. In the array area, each measured data corresponds to an array element. A subscript (for example, a numerical value) in an array associated with each measured data corresponds to identification data for the measured data. Therefore, the numerical value of the subscript indicated by the identification data can indicate the order of measurement of the associated measured data. It should be noted that the method of providing the identification data to the measured data is not limited to the method of using an array.

Wireless measuring unit 710 divides the measured data in storage area 79 into a plurality of groups, and transmits each of the divided groups. One group includes one or more measured data. Here, this group will be referred to as a "data block." Specifically, wireless measuring unit 710 transmits a data block of measured data associated with an identification number(s) (identification data) designated by data collection device 800, to data collection device 800. The data size of a data block is smaller than the total size of all of the measured data. Accordingly, in the second embodiment, the time for which connection of a wireless line required between wireless measuring unit 710 and data collection device 800 should be maintained only has to be set such that one data block can be transmitted during the time. Therefore, the time for which the connection of the wireless line should be maintained can be easily secured. Wireless measuring unit 710 can transmit all of the measured data obtained by vibration sensors 70A to data collection device 800, by repeating transmission of the measured data in data blocks.

In the second embodiment, writing of the measured data into storage area 79 and reading of the measured data from storage area 79 are performed with a time difference, instead of being performed simultaneously (in parallel). Specifically, at the time of measuring vibration, CPU 75 stores all of the measured data obtained by vibration sensors 70A in storage area 79. At the time of subsequent transmission, CPU 75 reads the measured data from storage area 79, and transmits the read measured data to data collection device 800 in data blocks as described above. Thereby, sampling of all of the measured data (storing of the measured data into storage area 79) can be reliably performed. Further, the sampling rate of the measured data and the rate of transmitting the measured data to data collection device 800 can be handled independently.

(Configuration of Data Collection Device 800)

Figure 12:
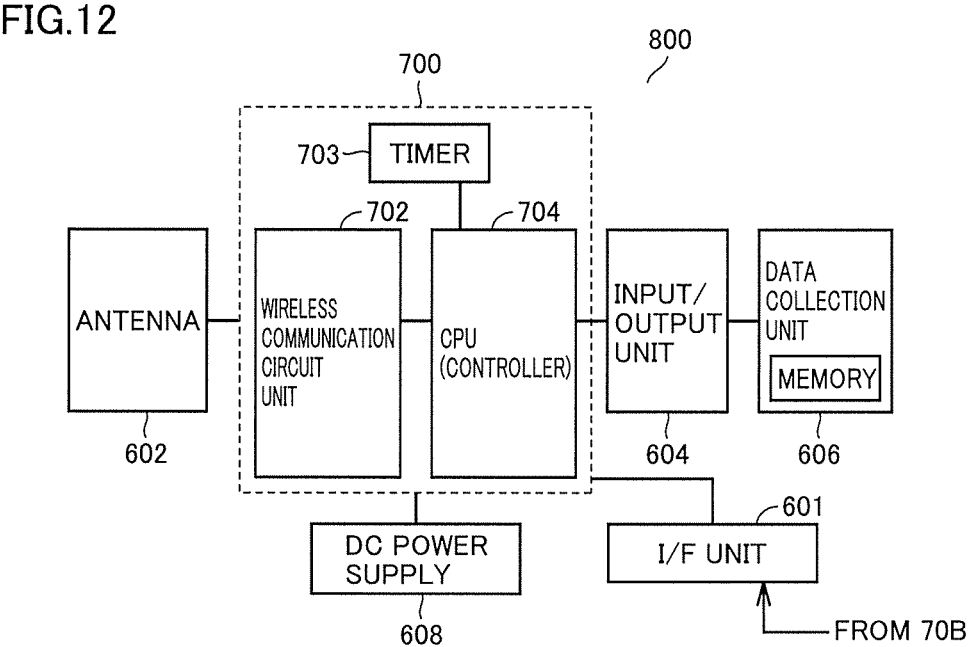
FIG. 12 is a block diagram showing an example of a configuration of a data collection device in accordance with the second embodiment.

FIG. 12 is a block diagram showing an example of a configuration of data collection device 800 in accordance with the embodiment of the present invention. I/F unit 601 corresponds to a data obtaining unit that receives measured data of vibration from wiredly connected vibration sensor 70B, and outputs the obtained data and information to CPU 704 in the order of reception (obtainment). Since the configuration of data collection device 800 is the same as the configuration of FIG. 5, the description thereof will not be repeated.

(Configuration of Communication Packets)

Figure 13:
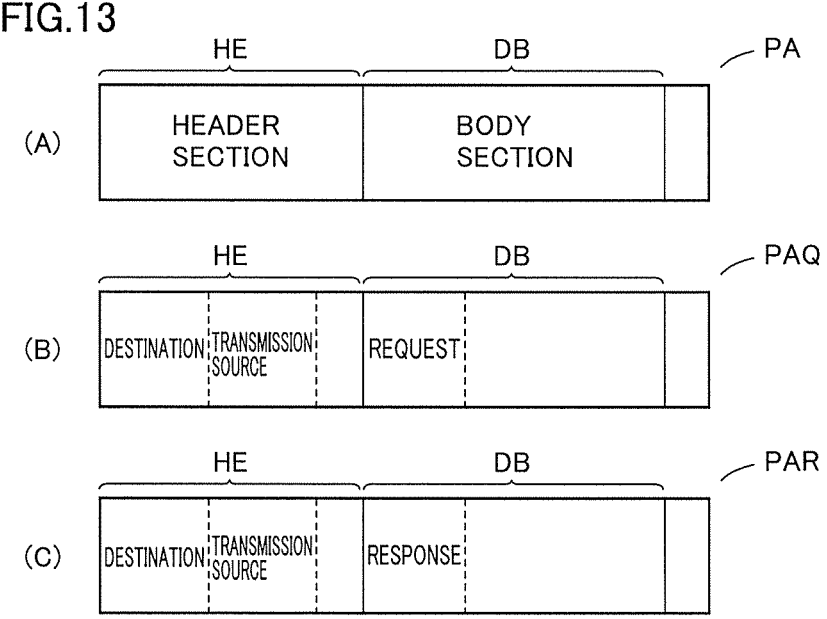
FIGS. 13(A), (B), and (C) are views each showing an example of a packet for communication in accordance with the second embodiment.

FIGS. 13(A), (B), and (C) are views each showing an example of a packet for communication in accordance with the second embodiment. FIG. 13(A) shows a configuration of packet PA which is the same as that in the first embodiment. Packet PA includes header section HE and body section DB. Header section HE includes information that identifies a destination and a transmission source of the packet (such as addresses), and body section DB includes data to be transmitted.

Wireless measuring unit 710 and data collection device 800 communicate using packet PA. As to the identification information to be stored in header section HE, wireless measuring unit 710 prestores the information in memory 76, and data collection device 800 stores the information in a memory (not shown) which can be accessed by CPU 704. It should be noted that a frame may be used instead of a packet.

FIG. 13(B) shows a request packet PAQ. Request packet PAQ is a packet that allows data collection device 800 to request wireless measuring unit 710 to transmit the measured data. A request command for requesting transmission is stored in body section DB of packet PAQ.

FIG. 13(C) shows a response packet PAR that stores a response to request packet PAQ. Wireless measuring unit 710 transmits response packet PAR as a response to request packet PAQ from data collection device 800. A response command for request packet PAQ is stored in body section DB of response packet PAR.

(Data Transmission)

In the state monitoring system for the wind turbine in accordance with the second embodiment, CPU 75 of wireless measuring unit 710 divides the measured data in storage area 79 into a plurality of data blocks. When CPU 75 receives one request packet PAQ from data collection device 800, CPU 75 transmits one of the plurality of data blocks to data collection device 800. Reception of request packet PAQ and transmission of a data block are repeated by the number of the plurality of data blocks, and thereby all of the measured data are transmitted to data collection device 800.

Next, divided transmission using data blocks will be described in comparison with batch transmission of all of the measured data. First, preconditions will be described. Specifically, storage area 79 stores 1536000 measured data (sampling cycle: 25.6 kHz, measurement: for 60 seconds, data size of one measured data: 2 bytes). Wireless measuring unit 710 transmits the measured data in storage area 79 at a transmission rate of 50000 bytes/sec (400000 bps). Further, the size of a transmission buffer of wireless measuring unit 710 is 1100 bytes, and the size of a reception buffer of data collection device 800 is 2048 bytes. The batch transmission of all of the measured data and the divided transmission using data blocks under such preconditions will be described based on comparison therebetween.

When the batch transmission of all of the measured data is performed under such preconditions, the time taken to receive data of 1536000×2 (bytes)=3072000 bytes (data reception time) is 3072000/5000=61.4404 sec.

As to the number of request commands from data collection device 800, the request command processing overhead time per command is 2 msec/command, and the request command processing overhead time is 0.002×1=0.002 sec.

Further, as to the number of times of transmission of responses to the request command from wireless measuring unit 710, the transmission overhead per transmission is 2 msec/transmission, and the transmission overhead time is 0.002×1=0.002 sec.

Since the size of the transmission buffer of wireless measuring unit 710 is 1100 bytes, the number of times of data transmission from wireless measuring unit 710 to data collection device 800 is 3072000/1100=2793 times.

Accordingly, in the case of the batch transmission, when data collection device 800 transmits a request command once, data transmission is repeated 2793 times from wireless measuring unit 710. If data collection device 800 cannot receive the data from wireless measuring unit 710 during the data transmission and the data transmission is interrupted, data collection device 800 cannot request wireless measuring unit 710 to transmit the data which has not been able to be received, at the time of interruption.

The time required for transmission in the case of the batch transmission will be determined below. The number of times of reception is 2793 times, the reception overhead per reception is 2 msec/reception, and the reception overhead time is 0.002×2793=5.586 sec. Further, when the data transmission has been interrupted and thus data collection device 800 transmits a request command after the batch transmission is terminated, data collection device 800 receives a response to the request command from wireless measuring unit 710. As to the reception of this response, in data collection device 800, the number of times of reception is once, the overhead for processing the response is 2 msec/reception, and the overhead time for processing the response is 0.002×1=0.002 sec.

Therefore, in the case of the batch transmission, the time required for transmission is 61.4404+0.002+0.002+5.586+0.002=67.0324 sec. In practice, a delay time for CPU processing should be added, and thus the time required for transmission can be estimated at approximately 70 sec.

The time required for transmission in the case of the divided transmission will be described. When it is assumed that one data block includes 512 measured data, the number of data blocks that should be transmitted by wireless measuring unit 710 is (1536000/512)=3000 data blocks. Accordingly, the number of times of transmission of request commands by data collection device 800 is 3000 times, and the number of times of reception of data blocks is 3000 times.

Therefore, in the case of the divided transmission, the data transmission time is 61.4404 sec, the overhead time for processing the request commands is 2 msec×3000=6 sec, and the transmission overhead time is 2 msec×3000=6 sec. Further, the reception overhead time is 0.002×3000=6 sec, and the overhead time for processing responses to the request commands is 0.002×3000=6 sec. As a result, in the case of the divided transmission, the time required for transmission is 61.4404+6+6+6+6=85.4404, and can be estimated at approximately 85 sec.

Thus, in the case of the divided transmission, it takes 85 sec to transmit all of the measured data, whereas the time required for transmitting one data block is as short as (85/3000)=0.028 sec. Therefore, even when the time for which connection of wireless communication can be maintained is short, data can be transmitted more reliably by the divided transmission in data blocks, than the batch transmission.

It should be noted that, although one data block here is constituted by 512 measured data, the number of the measured data in one data block is not limited to 512. That is, it is desirable that the number of the measured data constituting one data block is determined to be variable based on the time for which connection of wireless communication can be maintained between data collection device 800 and wireless measuring unit 710, the overhead time taken to transmit the request commands, and the like.

(Process Flowchart)

Figure 14:
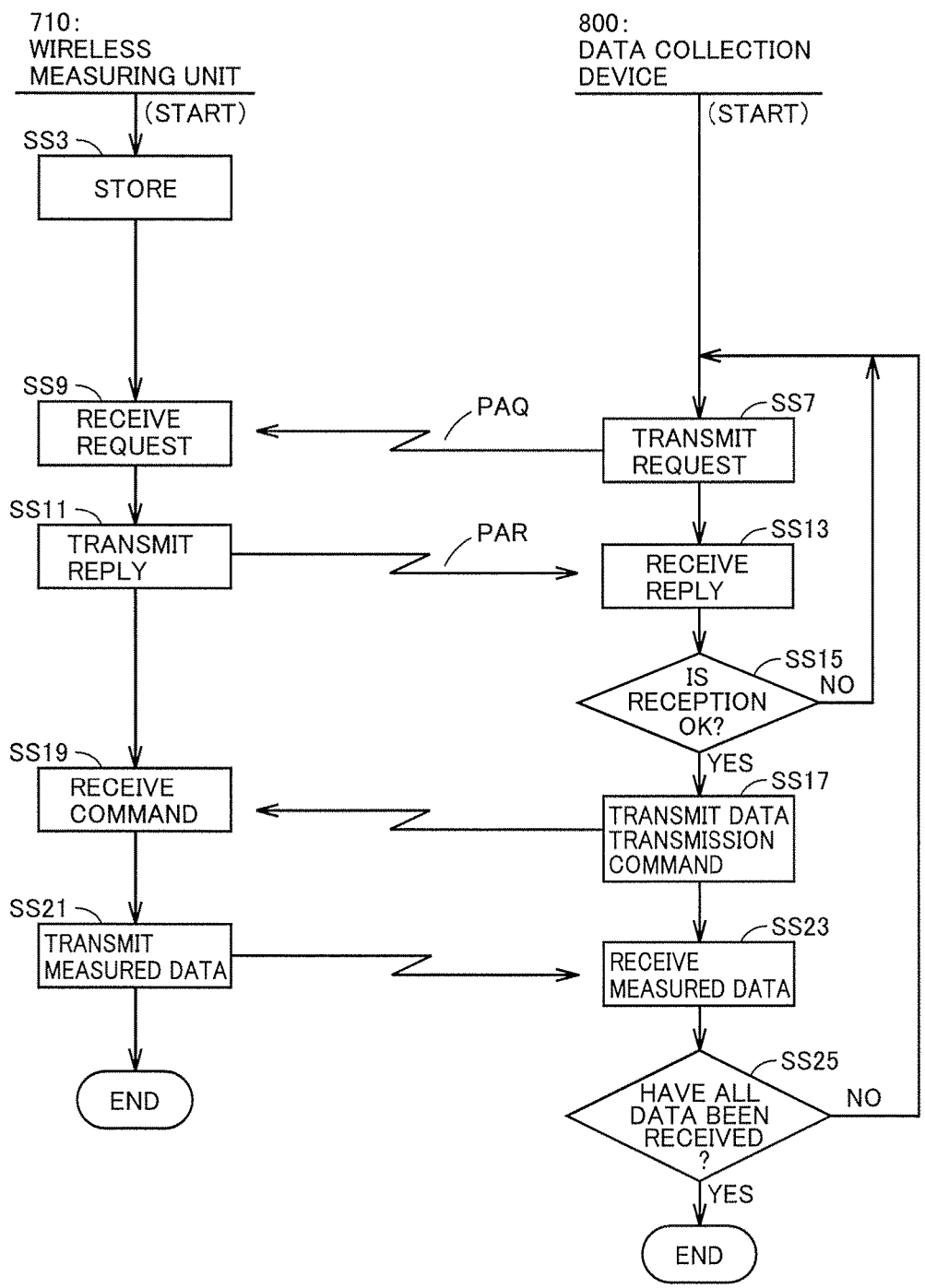
FIG. 14 is a flowchart showing a communication sequence in accordance with the second embodiment and processing related to the communication sequence.

FIG. 14 is a flowchart showing a communication sequence between wireless measuring unit 710 and data collection device 800 in accordance with the second embodiment and processing related to the communication sequence. The processing according to this flowchart is implemented by executing programs. The program on the wireless measuring unit 710 side is prestored in memory 76. In response to a measurement command from data collection device 800, CPU 75 reads the program from memory 76, and executes the read program. Further, the program on the data collection device 800 side is prestored in a memory (not shown) of wireless communication unit 700. For example, when data collection device 800 is powered on, CPU 704 reads the program from the memory, and executes the read program. It is assumed that 512 measured data per data block are transmitted in the processing of FIG. 14.

First, in wireless measuring unit 710, CPU 75 stores the measured data of vibration sensors 70A in an array of storage area 79 based on a measurement command received beforehand (step SS3). It is assumed that the measured data are stored at a sampling rate of 25600 Hz and the measured data are data for one second. Therefore, 25600 measured data are stored in storage area 79.

CPU 704 of data collection device 800 generates packet PAQ, and transmits the generated packet PAQ (step SS7). A request command in packet PAQ includes "1 to 512" as identification numbers for designating the measured data which are requested to be transmitted.

When CPU 75 of wireless measuring unit 710 receives packet PAQ (step SS9), CPU 75 generates packet PAR and transmits generated packet PAR as a reply (step SS11). A response command in body section DB of packet PAR includes the identification numbers "1 to 512" read from the request command received in step SS9.

CPU 704 of data collection device 800 performs processing of receiving packet PAR (step SS13). Based on the result of the processing, CPU 704 determines whether or not CPU 704 has been able to receive packet PAR (step SS15). Specifically, when CPU 704 determines that CPU 704 has not been able to receive packet PAR (NO in step SS15), the processing returns to step SS7. Further, when CPU 704 has been able to receive packet PAR in step SS13 but CPU 704 determines that the identification numbers in the response command in packet PAR do not match the identification numbers in the request command transmitted immediately before (NO in step SS15), the processing returns to step SS7.

When the processing returns to step SS7, CPU 704 retransmits the request command transmitted immediately before.

On the other hand, when CPU 704 determines that CPU 704 has been able to receive packet PAR (YES in step SS15), CPU 704 generates packet PA having a data transmission command stored in body section DB, and transmits generated packet PA to wireless measuring unit 710 (step SS17). This data transmission command includes the identification numbers "1 to 512" in packet PAQ transmitted immediately before.

CPU 75 of wireless measuring unit 710 receives the data transmission command from data collection device 800 (step SS19). Based on the identification numbers "1 to 512" in the received data transmission command, CPU 75 searches the array of storage area 79. Based on the result of search, CPU 75 reads 512 measured data indicated by the identification numbers "1 to 512" from the array. CPU 75 generates packet PA having 512 read measured data (measured data having the identification numbers given thereto) stored in body section DB, and transmits generated packet PA to data collection device 800 (step SS21).

CPU 704 of data collection device 800 receives packet PA having the measured data stored therein (step SS23). CPU 704 stores the received measured data in the memory of data collection unit 606.

CPU 704 of data collection device 800 determines whether or not CPU 704 has been able to receive all of the measured data designated by the above measurement command, from wireless measuring unit 710 (step SS25). Specifically, CPU 704 compares values of the identification numbers given to the measured data received in previous step SS23, with values 1 to 25600 indicating the total number of the measured data indicated by the measurement command (25600 measured data at 25600 Hz and for one second). When CPU 704 determines based on the result of comparison that "25600" is included in the values of the identification numbers of the measured data received immediately before, CPU 704 determines that CPU 704 has been able to receive all of the measured data (YES in step SS25). Thereby, the processing is terminated.

On the other hand, when CPU 704 determines based on the above result of comparison that "25600" is not included in the values of the identification numbers of the measured data received immediately before, CPU 704 determines that CPU 704 has not been able to receive all of the measured data yet (NO in step SS25). The processing returns to step SS7.

In step SS7, CPU 704 transmits packet PAQ for a next data block to wireless measuring unit 710 (step SS7). That is, CPU 704 generates packet PAQ having a request command including identification numbers "513 to 1024" for the next data block stored therein, and transmits generated packet PAQ to wireless measuring unit 710 (step SS7). Hereafter, processing for the next data block (measured data with the identification numbers "513 to 1024") is performed in the same way as described above.

Thus, transmission of the measured data in data blocks is repeated by wireless measuring unit 710 until it is determined that all of the measured data have been able to be received (YES in step SS25), and transmission of the request command is repeated until data collection device 800 can normally receive a response command for the request command (see steps SS7 to SS15). Thereby, even when the connection condition for wireless communication is not good (such as a condition that the connection time of wireless communication is short), data collection device 800 can receive (collect) all of the data blocks (all of the measured data) from wireless measuring unit 710.

(Variation)

A variation of the second embodiment will be described. The number of the measured data included in the data block described above is not limited to 512 as described above. Further, although it is described that 512 measured data are always requested by request packet PAQ described above, the number of requested data may be modified by request packet PAQ.

In the second embodiment described above, since the measured data are transmitted in data blocks, the time for which connection of wireless communication should be maintained can be shortened to a time in which one data block can be transmitted. Therefore, even when wireless measuring unit 710 moves to a position where an electric wave for wireless communication is blocked due to the rotation of a rotary body on which wireless measuring unit 710 is placed, all of the data blocks (all of the measured data) can be transmitted to data collection device 800.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

10: wind turbine; 70, 710: wireless measuring unit; 70A, 70B: vibration sensor; 79: storage area; 80, 800: data collection device; 330: data server; 340: monitoring terminal; 606: data collection unit; PA: packet; PAQ: request packet; PAR: response packet.

The invention claimed is:

1. A state monitoring system that monitors a state of an apparatus provided in a wind turbine, comprising:
   a wireless measuring unit, including a sensor, a first timer, a first memory for storing measured data obtained from the sensor and first time data measured by the first timer and associated with the stored measured data according to order of measurement, and a communication unit for transmitting the measured data obtained from the sensor to the data collection device; and
   a data collection device, including a second timer and configured to use second time data measured by the second timer to perform synchronous processing that transmits a time measurement request requesting the first timer to measure time in synchronization with the second timer to the wireless measuring unit,
   wherein the data collection device is configured to send a request to the wireless measuring unit requesting retransmission of the measured data and including information that specifies a first time based on information from the second timer, when the data collection device determines that it has not received measured data from the wireless measuring unit based on information from the second timer.

2. The state monitoring system according to claim 1, wherein the data collection device is further configured to obtain measured data from a sensor which is different from the sensor and is provided to the apparatus, and stores the obtained measured data with which second time data measured by the second timer is associated according to order of measurement.

3. The state monitoring system according to claim 2, wherein the data collection device is further configured to designate a time interval for measurement to the wireless measuring unit, and requests the wireless measuring unit to divide a plurality of measured data into a plurality of blocks for each designated number of data, and to transmit the measured data in the divided blocks.

4. The state monitoring system according to claim 3, wherein the data collection device is further configured to the data collection device has not been able to receive all of the measured data, request the wireless measuring unit to retransmit the measured data in a block other than already received blocks.

5. The state monitoring system according to claim 4, wherein, when the data collection device has not been able to receive all of the measured data from the wireless measuring unit, the data collection device is further configured to receive the blocks having a reduced number of the measured data per block.

6. The state monitoring system according to claim 1, wherein
the apparatus includes a bearing that supports a shaft connected to a windmill,
the bearing has an inner race through which the shaft passes, and an outer race provided around an outer circumference of the inner race,
one of the inner race and the outer race rotates concentrically about the shaft in cooperation with rotation of the windmill, and the other is fixed, and
the wireless measuring unit including the sensor is provided on at least one of the inner race and the outer race.

7. A state monitoring system that monitors a state of an apparatus provided in a wind turbine, comprising:
a wireless measuring unit including a sensor for detecting the state, a first timer, a memory for storing measured data obtained from the sensor and first time data measured by the first timer and associated with the stored measured data according to order of measurement, and a wireless communication unit for communicating with the data collection device, and a controller configured to transmit a data group including a predetermined number of measured data of a plurality of measured data stored in the memory, through the wireless communication unit, when the wireless communication unit receives a request from the data collection device; and
a data collection device, including a second timer and configured to use second time data measured by the second timer to perform synchronous processing that transmits a time measurement request requesting the first timer to measure time in synchronization with the second timer to the wireless measuring unit,
wherein the data collection device is configured to send the request based on information from the second timer.

8. The state monitoring system according to claim 7, wherein
the request includes a requested number indicating the number of the measured data, and
the predetermined number is indicated by the requested number included in the received request.

9. The state monitoring system according to claim 7, wherein the data collection device is configured to when the data collection device has not been able to receive the data corresponding to the request, retransmit the request to the wireless measuring unit.

10. The state monitoring system according to claim 7, wherein
the apparatus includes a bearing that supports a shaft connected to a windmill,
the bearing has an inner race through which the shaft passes, and an outer race provided around an outer circumference of the inner race,
one of the inner race and the outer race rotates concentrically about the shaft in cooperation with rotation of the windmill, and the other is fixed, and
the wireless measuring unit including the sensor is provided on at least one of the inner race and the outer race.

* * * * *